United States Patent

Podsiadlo et al.

[11] Patent Number: 5,743,997
[45] Date of Patent: Apr. 28, 1998

[54] SHEET MATERIAL SEALING ARRANGEMENT

[75] Inventors: James E. Podsiadlo; Mark R. Kucera, both of Walled Lake, Mich.

[73] Assignee: Elopak Systems AG, Glattbrugg, Switzerland

[21] Appl. No.: 624,099

[22] Filed: Mar. 29, 1996

[51] Int. Cl.⁶ .................................. B30B 5/02; B65B 7/18
[52] U.S. Cl. ....................... 156/583.3; 53/373.2; 156/323
[58] Field of Search .................................. 156/583.3, 323, 156/583.1, 566, 567, 69; 53/373.2

[56] References Cited

U.S. PATENT DOCUMENTS

| | | |
|---|---|---|
| 3,243,934 | 4/1966 | Kinney . |
| 3,493,451 | 2/1970 | Beery ................................. 156/219 |
| 3,707,428 | 12/1972 | Roberts ............................. 156/583.3 |
| 4,084,999 | 4/1978 | Rucker ............................... 156/466 |
| 4,306,400 | 12/1981 | Coleman et al. . |
| 4,430,069 | 2/1984 | Carlisle ............................. 493/203 |
| 4,529,472 | 7/1985 | Hsu .................................... 156/498 |
| 4,641,482 | 2/1987 | Metz .................................. 53/388 |
| 4,704,183 | 11/1987 | Sigerist ............................. 156/475 |
| 4,715,923 | 12/1987 | Knoll ................................. 156/380.9 |
| 4,930,288 | 6/1990 | Juenkersfeld . |
| 4,952,777 | 8/1990 | Kogasaka .......................... 219/243 |
| 5,085,029 | 2/1992 | Esper ................................. 156/583.3 |

FOREIGN PATENT DOCUMENTS

| | | |
|---|---|---|
| 0242805A | 10/1987 | European Pat. Off. . |
| 686942A | 8/1930 | France . |
| 8104901A | 5/1983 | Netherlands . |

*Primary Examiner*—Daniel Stemmer
*Attorney, Agent, or Firm*—Reising, Ethington, Barnard & Perry, PLLC

[57] ABSTRACT

A sealing arrangement for sealing overlapped edge portions of laminates folded onto a support member. The arrangement includes a pressure pad assembly and a drive member. An elastomeric disk is retained compressed between the drive member and the pressure pad assembly. A drive unit serves to extend the drive member to thereby urge the pressure pad via the elastomeric disk into pressure sealing engagement with the overlapped laminates on the support member.

8 Claims, 2 Drawing Sheets

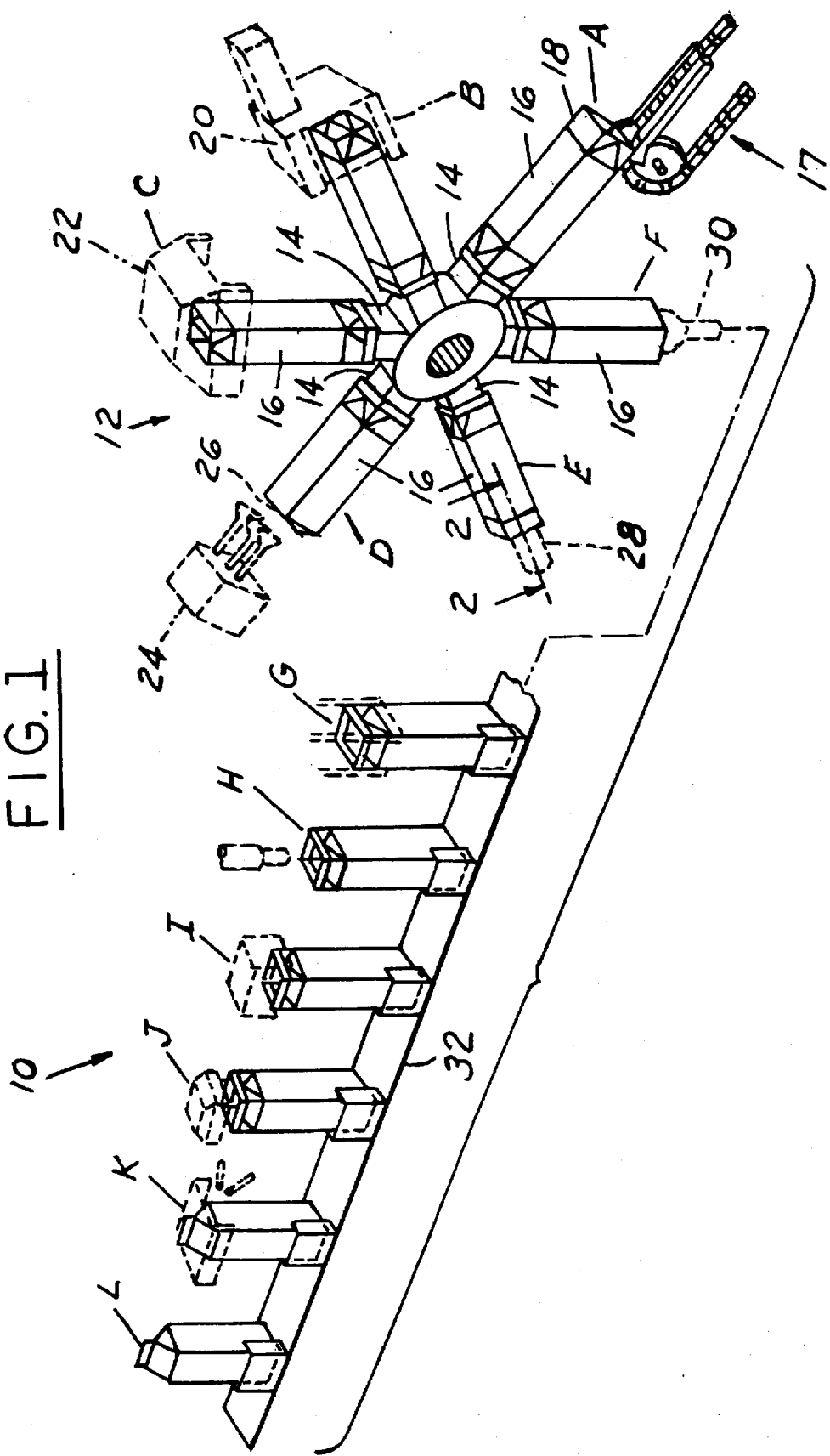

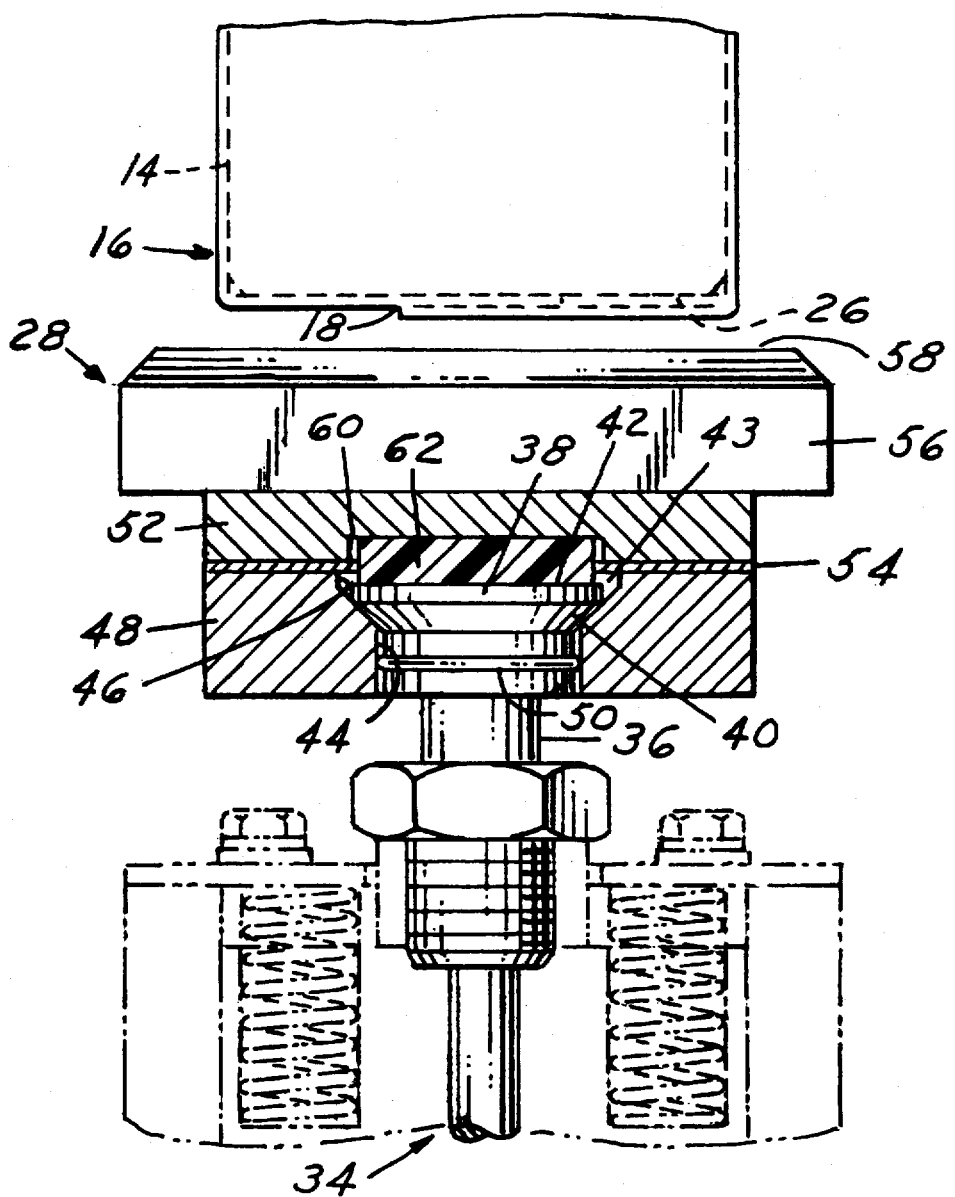

SHEET MATERIAL SEALING ARRANGEMENT

FIELD OF THE INVENTION

This invention relates generally to the sealing by a pressure pad of overlapped sheet portions backed by a support member, and, more specifically, to a self aligning overtravel drive arrangement for sealing an overlapped flat end closure of a four-sided carton mounted around a mandrel.

BACKGROUND ART

Heretofore, sealing of overlapped flat surface materials have included various elastomeric or rubber or other type of flexible platens or pressure pads, wherein such elements have been in direct contact with the materials being pressed, to account for variations in material thicknesses. Such arrangements are disclosed in U.S. Pat. Nos. 3,493,451; 4,430,069; 4,529,472; 4,704,183; 4,715,923; and 4,952,777.

Metz U.S. Pat. No. 4,641,482 discloses heat transfer members which are forced toward the path of moving packages by an adjacent leaf spring.

Rucker U.S. Pat. No. 4,084,999 discloses a sealing arrangement wherein a coil spring is resiliently mounted between a friction rim and a sleeve secured in a bracket, wherein the friction rim rolls along the material being sealed.

DISCLOSURE OF THE INVENTION

A general object of the invention is to provide an improved sealing arrangement for sealing overlapped sheet portions, such as flat panels.

Another object of the invention is to provide an improved panel sealing arrangement including a self aligning overtravel drive mechanism.

A further object of the invention is to provide a panel sealing arrangement including a drive member having a pressure pad mounted on the terminal end thereof, and an intermediate elastomeric pad providing both protective overtravel for the drive member and automatic adjustment of the pressure pad for thickness variations in the panels being sealed.

A still further object of the invention is to provide a panel sealing arrangement including a pressure pad assembly of interconnected pressure pad, back-up plates shim, and collar components; an opening having progressive cylindrical and frusto-conical wall surfaces formed through the collar, a drive member extending to a frusto-conical distal end segment of the drive member seated on the frusto-conical wall surface, a recess formed in the back-up plate opposite the frusto-conical wall surface, an elastomeric pad compressed between a base wall of the recess and the frusto-conical distal end segment, and a drive unit for driving the drive member to thereby urge the pressure pad via said elastomeric pad into pressure-sealing engagement with the overlapped flat panels on the support member.

These and other objects and advantages will become more apparent when reference is made to the following drawings and to the accompanying description.

BRIEF DESCRIPTION OF THE DRAWINGS

FIG. 1 is a diagrammatic side perspective view of a forming, filling and sealing machine embodying the invention, in particular of a turret-portion thereof; and FIG. 2 is an enlarged cross-sectional view taken along the plane of the line 2—2 of FIG. 1, and looking in the direction of the arrows.

BEST MODE FOR CARRYING OUT THE INVENTION

Referring now to the drawings in greater detail, FIG. 1 illustrates a forming, filling and sealing machine, represented as 10, including an indexible turret 12 having a plurality of radially extending mandrels 14. Tubular thermoplastic coated paperboard cartons 16 are loaded by a loading mechanism 17 onto respective mandrels 14 at a loading station A at, say, 4:00 o'clock. Each loaded mandrel 14 and its carton 16 with end closure panels 18 thereof extended beyond the end face of the mandrel, are indexed to a prebreaking station B at, say, 2:00 o'clock, where a prebreaker unit 20 initially breaks the fold lines or scorelines of the panels 18 in a usual manner.

The mandrel 14 and carton 16 are then indexed to a heating station C at 12:00 o'clock, where a heater 22 heats the extended panels 18, which are then indexed to a folding station D at 10:00 o'clock, where a folding mechanism 24 folds the heated panels 18 into a flat configuration with overlapping edge portions, against the end face 26 of the mandrel 14. At a sealing station E at 8:00 o'clock, a pressure sealing assembly 28 is pressed against the flat end closure to seal the heated overlapped edge portions of the panels 18 together.

The mandrel 14 and carton 16 are then indexed to a station F at 6:00 o'clock, where the carton is stripped by a stripper 30 and placed on a conveyor 32 for further downstream filling and top sealing operations, represented as G, H, I, J, K and L, but not forming a part of the present invention.

Referring now to FIG. 2, the pressure sealing assembly 28 includes a mechanical or hydraulic drive unit, represented at 34, having a drive stud 36 extending therefrom to connect with a larger diameter segment 38. A frusto-conical terminal segment 40 is formed on the larger diameter segment 38. A flat face 42 is formed on the segment 40. The segments 38 and 40 extend through an opening 43 defined by cylindrical and frusto-conical wall surfaces 44 and 46, respectively, formed in a collar 48. An O-ring seal 50 is confined between the segment 38 and the surface 44. The collar 48 is secured in any suitable manner, such as by screws (not shown), to a back-up plate 52, with a shim 54 therebetween. A pressure pad 56 is secured in any suitable manner to the back-up plate 52. A flat face 58 is formed on the outer end of the pressure pad 56.

A recess 60 is formed in the back-up plate 52 directly opposite the flat face 42. A pad or disk 62 formed of a suitable elastomeric material, such as urethane, is mounted between the flat: end face 42 and the bottom of the recess 60, under a slight compression at assembly. The shim 54 thickness is selected to provide the desired compression of the disk 62.

In operation, the face 58 of the pressure pad 56 is extended by the drive shaft 36 with its end segments 38 and 40 and the elastomeric disk 62, into engagement with the edge portions of any overlapped laminates, such as the end panels 18 of the carton 16 mounted around the mandrel 14, to squeeze the panels between the pressure face 58 and the end face 26 of the mandrel.

Being of a predetermined durometer and under a predetermined slight compression, the elastomeric disk 62 serves the following purposes: (1) to act as a protective overtravel device for the drive unit 34; (2) to allow automatic adjustment of the pressure pad 56 and its associated back-up plate 52 and the collar 48: (2a) for any differences in thicknesses of the successive carton panels 18, (2b) for any incorrect initial setup of the pressure pad 56, or (2c) for any subsequent reason for jarring the pressure pad out of position, such as any interference with an edge thereof. An advantage of the predetermined slight pre-compression of the disk 62 is that the user is better able to determine the value o the actual pressure which is applied to the overlapped panels. An advantage of use of an elastomeric disk over use of a coil or leaf spring is that it can be more compact for the same degree of resistance to compression.

INDUSTRIAL APPLICABILITY

It should be apparent that the invention provides an improved panel sealing arrangement for sealing overlapped thermoplastic coated flat panels, including the features of a self aligning overtravel drive mechanism and a pressure pad which is automatically adjustable particularly for thickness variations in the panels being sealed.

It should also be apparent that the invention provides an improved pressure sealing arrangement for any overlapped, heated laminates positioned on a support member.

While but one embodiment of the invention has been shown and described, other modifications thereof are possible within the scope of the following claims. For example, the invention is applicable to top-sealing of a carton, such as at station K, wherein overlapped top end panel parts are squeezed between two jaws, in which case a jaw assembly and drive arrangement corresponding to the pressure sealing assembly 28 would be provided for one of the two jaws.

What is claimed in:

1. A sealing arrangement for sealing overlapped sheet portions backed by a support member, the arrangement comprising pressure-applying means, a drive member, an elastomeric pad between the drive member and the pressure-applying means, and drive means for urging, via said drive member and said elastomeric pad, said pressure-applying means into sealing engagement with the overlapped sheet portions, wherein said pressure-applying means comprises an interconnected assembly of pressure pad, intermediate back-up plate, and collar, wherein an opening is formed through the collar to receive an end portion of the drive member, a recess is formed in the back-up plate, and said elastomeric pad is confined between a base wall of said recess and said end portion.

2. A sealing arrangement according to claim 1, wherein said elastomeric pad is substantially permanently in a compressed condition.

3. A sealing arrangement according to claim 2, and further comprising a shim between the back-up plate and the collar for controlling the desired initial compression of said elastomeric pad.

4. A sealing arrangement according to claim 1, wherein said opening includes a cylindrical portion and a frusto-conical portion, and said end portion of said drive unit includes co-operating round and frusto-conical segments, with the frusto-conical segment seated in the conical portion.

5. A sealing arrangement according to claim 1, wherein said elastomeric pad is formed of urethane.

6. A sealing arrangement according to claim 1, said support member being a mandrel, and said overlapped sheet portions being end panels of a thermoplastic-coated carton mounted around said mandrel, with said end panels folded onto an end face of said mandrel.

7. A sealing arrangement for sealing overlapped edge portions of thermoplastic-coated flat panels folded onto a support member, the arrangement comprising a pressure pad, a back-up plate, a shim, and a collar secured in seriation, an opening having progressive cylindrical and frusto-conical wall surfaces formed through said collar, a drive member extending to a frusto-conical distal end segment of the drive member seated on the frusto-conical wall surface, a recess formed in said back-up plate opposite said frusto-conical wall surface, an elastomeric pad compressed between a base wall of the recess and the frusto-conical distal end segment, and a drive unit for driving said drive member to thereby urge said pressure pad via said elastomeric pad into pressure-sealing engagement with the overlapped flat panels on the support member.

8. A sealing arrangement according to claim 7, said support member being a mandrel and said thermoplastic-coated flat panels being end panels of a carton mounted around said mandrel, with said flat panels folded onto one another on an end face of said mandrel.

* * * * *